(12) United States Patent
Striebel et al.

(10) Patent No.: US 9,784,385 B1
(45) Date of Patent: Oct. 10, 2017

(54) GROMMET AND METHOD OF USE THEREOF

(71) Applicants: Patrick A. Striebel, Pembroke, MA (US); James J. Storrer, Foxboro, MA (US)

(72) Inventors: Patrick A. Striebel, Pembroke, MA (US); James J. Storrer, Foxboro, MA (US)

(73) Assignee: Suncor Stainless, Inc., Plymouth, MA (US)

( * ) Notice: Subject to any disclaimer, the term of this patent is extended or adjusted under 35 U.S.C. 154(b) by 142 days.

(21) Appl. No.: 14/603,470

(22) Filed: Jan. 23, 2015

(51) Int. Cl.
| | |
|---|---|
| *B25B 27/00* | (2006.01) |
| *A44B 19/16* | (2006.01) |
| *F16L 3/12* | (2006.01) |
| *F16L 3/13* | (2006.01) |
| *F16L 3/123* | (2006.01) |
| *F16B 31/04* | (2006.01) |

(52) U.S. Cl.
CPC .............. *F16L 3/13* (2013.01); *F16L 3/1218* (2013.01); *A44B 19/16* (2013.01); *B25B 27/0092* (2013.01); *F16B 31/04* (2013.01); *F16L 3/12* (2013.01); *F16L 3/123* (2013.01); *F16L 3/1211* (2013.01); *F16L 3/1233* (2013.01); *F16L 3/1236* (2013.01); *Y10T 29/49863* (2015.01); *Y10T 29/49872* (2015.01); *Y10T 29/49876* (2015.01)

(58) Field of Classification Search
CPC . F16L 3/12; F16L 3/123; F16L 3/1233; F16L 3/1236; F16L 3/1218; F16L 3/13; A44B 19/16; B25B 27/0092; Y10T 29/49863; Y10T 29/49872; Y10T 29/49876
USPC .......................................... 29/451, 453, 446
See application file for complete search history.

(56) References Cited

U.S. PATENT DOCUMENTS

| | | | | | |
|---|---|---|---|---|---|
| 2,034,090 | A | * | 3/1936 | Douglas ................... | H01R 4/20 29/453 |
| 2,341,922 | A | * | 2/1944 | Robbins ................ | F16G 11/048 294/102.1 |
| 2,559,759 | A | * | 7/1951 | De Swart ................ | F16B 9/023 16/2.1 |
| 3,033,624 | A | * | 5/1962 | Biesecker ............... | F16C 11/04 174/153 G |
| 3,164,054 | A | * | 1/1965 | Biesecker ............... | E05B 79/12 16/2.1 |
| 3,220,074 | A | * | 11/1965 | Ehmann .................. | D07B 1/167 24/115 M |
| 3,470,291 | A | * | 9/1969 | Johnson ................ | B29C 51/002 264/292 |
| 3,768,115 | A | * | 10/1973 | Hoffmann ............... | F16C 11/04 16/2.1 |

(Continued)

*Primary Examiner* — Christopher Besler
*Assistant Examiner* — Bayan Salone
(74) *Attorney, Agent, or Firm* — Burns & Levinson LLP; Jacob N. Erlich; Marlo Schepper Grolnic (57) ABSTRACT

A grommet is at least partially comprised of a clear, rigid material is disclosed. The body of the grommet tapers from a proximal end to a distal end, allowing the grommet to be guided into a hole in a post of a handrail system. The interior of the body includes an longitudinal cannulation open to the exterior of the grommet via a helical cut in the surface, allowing for a wire rope to pass through. The grommet can be installed whether or not a wire rope has previously been passed through a railing post.

20 Claims, 6 Drawing Sheets

(56) References Cited

U.S. PATENT DOCUMENTS

| | | | | |
|---|---|---|---|---|
| 3,895,879 | A * | 7/1975 | Burtelson | E04C 5/122 24/115 R |
| 4,066,368 | A * | 1/1978 | Mastalski | F16G 11/04 24/115 M |
| 4,074,945 | A * | 2/1978 | Kraus et al. | F16C 1/103 285/140.1 |
| 4,304,149 | A * | 12/1981 | Heimann | F16C 1/103 74/502.4 |
| 4,459,722 | A * | 7/1984 | Dziedzic | F16G 11/02 24/115 N |
| 4,546,666 | A * | 10/1985 | Secord | B60K 26/04 24/128 |
| 4,619,088 | A * | 10/1986 | Ripoll Garcia-Mansilla | E04C 5/12 52/223.13 |
| 4,627,762 | A * | 12/1986 | Scotti | F16G 11/04 24/136 R |
| 4,671,695 | A * | 6/1987 | Scotti | F16G 11/04 24/265 AL |
| 4,738,155 | A * | 4/1988 | Stocker | F16C 1/14 403/197 |
| 4,750,886 | A * | 6/1988 | Portelli | E05B 79/12 384/125 |
| 5,383,905 | A * | 1/1995 | Golds | A61B 17/0487 24/136 L |
| 8,567,151 | B2 * | 10/2013 | Walther | E04B 1/003 52/223.13 |
| 9,249,577 | B2 * | 2/2016 | Ross | E04F 11/1859 |
| 2014/0138596 | A1 * | 5/2014 | Ross | E04F 11/1859 256/47 |

* cited by examiner

GROMMET AND METHOD OF USE THEREOF

BACKGROUND

This disclosure relates generally to grommets, and more particularly to grommets used for handrail systems.

In handrail systems, such as those used for safety on stairs or outdoor decks, a grommet is often used to fit over a wire rope, and both the grommet and the rope fitted into a throughhole of a post, the grommet preventing movement of the wire within the throughhole. A standard grommet includes two flanges with a reduced center diameter for being fitted inside of the throughhole of the post. An opening for receiving a wire extends transversely through the flanges. Typical applications using a grommet require the grommet to be placed in the post prior to the installation of the wire rope. Additionally, a typical grommet cannot be installed once a wire rope has already been passed through the railing post.

In order to install typical grommets, one of the two flanges must be collapsed in order to force it into the throughhole. This requires the grommet to be made of flexible rubber which is usually black, since clear rubber potentially costs more and may yellow in sunlight.

There is therefore a need for a grommet that can be installed after a wire rope has been passed through the railing post, and which can be made of a material which is UV-resistant and aesthetically-pleasing.

SUMMARY

Described herein is a grommet for use with a railing system. The grommet is at least partially comprised of a clear, rigid material, although it is contemplated within the scope of this disclosure that the grommet be fabricated using an opaque material, such metal or ceramic. The body of the grommet tapers from a proximal end to a distal end, allowing the grommet to be guided into a hole in a post of a handrail system. The interior of the body includes an longitudinal cannulation open to the exterior of the grommet via a helical cut in the surface, allowing for the wire rope to pass through. The grommet described herein can be installed whether or not wire rope has previously been passed through a railing post.

BRIEF DESCRIPTION OF THE DRAWINGS

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

FIG. 3 is a perspective cross section view of rubber grommets installed in a railing post, with wire rope passing through.

DETAILED DESCRIPTION

The present embodiments provide a grommet for rail systems that can be installed whether or not a wire rope or other rope-like rail (which can be made out of polymers, metal, natural fibers or the like) has been installed through railing posts of the rail system. The grommet can also prevent deflection in the wire rope, by reducing the ability of the wire to be moved in any direction perpendicular to the axis of the wire. The grommet can be comprised of a rigid material that is aesthetically pleasing, UV resistant and nearly invisible, and which may have a smooth or a textured surface. Furthermore, the grommet can prevent sound from traveling from the movement of the wire rope and prevents dirt, residue or moisture from within the post to transfer to the strands of the wire rope.

In the description that follows, like components have been given the same reference numerals, regardless of whether they are shown in different examples. To illustrate an example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Figure 1:
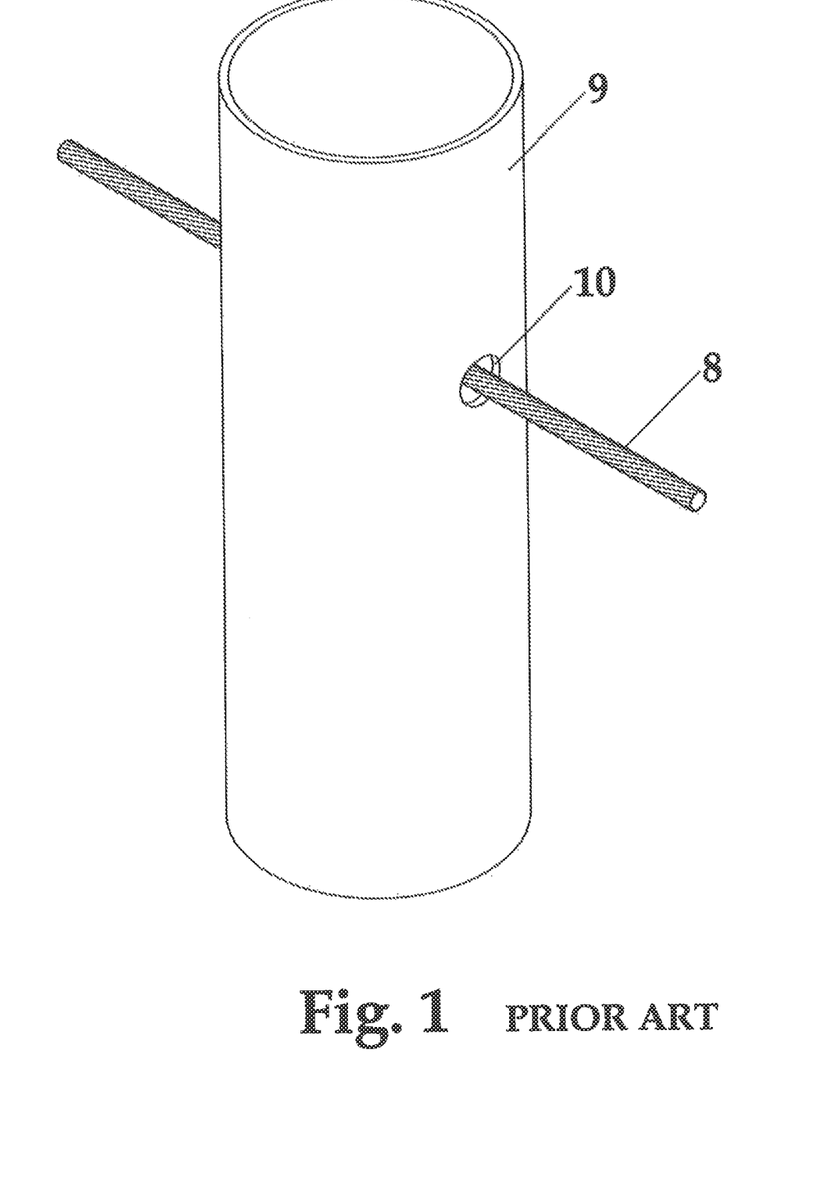
FIG. 1 is a perspective view of a railing post with wire passing through a hole with no grommet.
Figure 2:
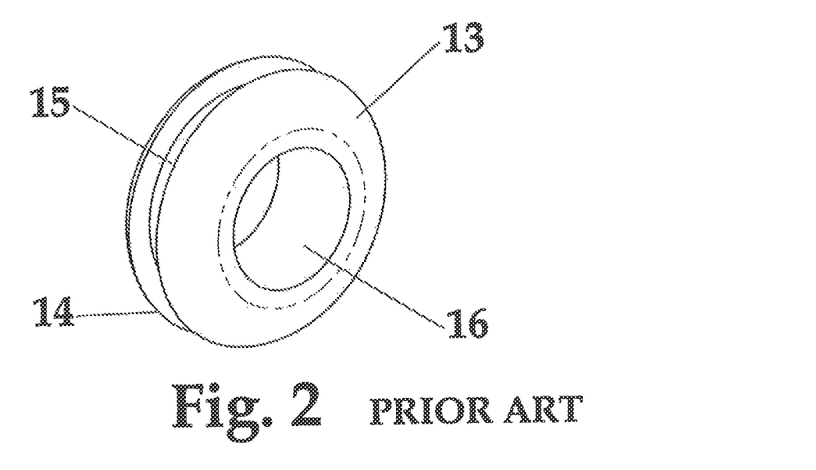
FIG. 2 is a perspective view of a typical rubber grommet.
Figure 3:
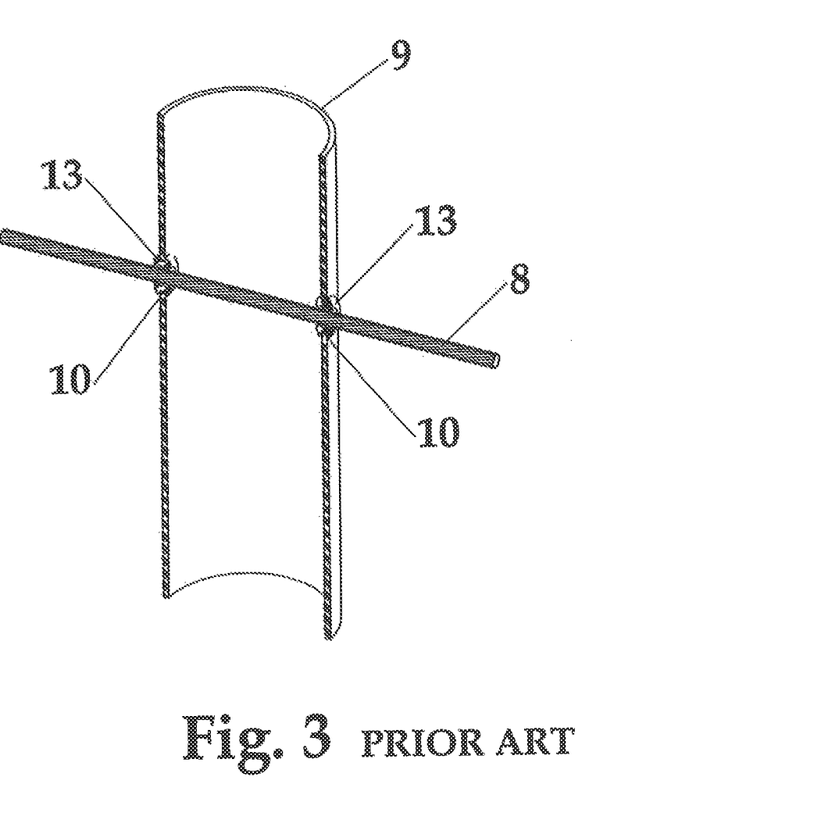

Referring now to FIGS. 1-3, a typical grommet shown in a typical use is illustrated. In FIG. 1, a post 9 of a handrail system is shown with a wire rope or the like 8 passing through the post 9 via hole 10. Without a grommet, the space between the wire 8 and the hole 10 may cause the wire 8 to deflect due to the excess space, and create sound as wind or other objects are applied to the wire rope 8. In FIG. 2, a typical rubber grommet 13 is shown. The grommet includes raised flanges 14, a reduced center diameter 15 and an opening 16 for receiving the wire rope 8. FIG. 3 depicts the rubber grommet 13 installed in the holes 10 of a post 9 to insulate the wire 8. In order to install the grommet 13 into the post 9, one of the rubber flanges 14 of the typical grommet 13 must be collapsed in order to force it into hole 10, a difficult procedure. In this typical use, the grommet 13 must be installed into the holes 10 prior to the wire 8 being installed and cannot be installed after wire rope 8 has been positioned within post 9.

Figure 4:
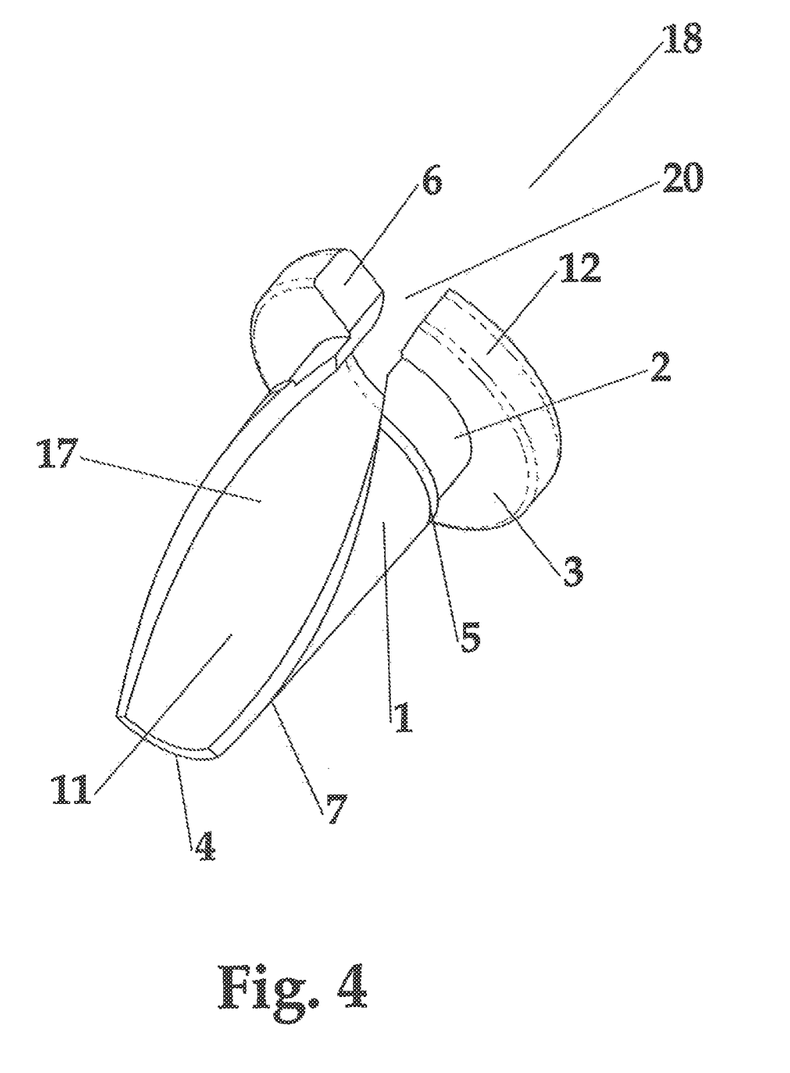
FIG. 4 is a perspective view of the grommet, illustrating all features.

FIG. 4 illustrates an embodiment of the grommet 18 of the current disclosure. The grommet can be at least partially comprised of a clear, rigid material such as hard plastic or other suitable material to allow for stable fit and retention and to render the grommet nearly invisible against a post. In this embodiment, the grommet 18 has body 1 that tapers from a proximal end 5 to a distal end 4, allowing the grommet 18 to be guided into a hole in a post of a handrail system. It is contemplated within the scope of this invention that the distal end 4 of the body 1 include tabs or ridges (not shown). The interior of the body 1 includes a longitudinal cannulation 17 for the rail or wire rope 8 to pass through. The cannulation 17 is at least partially open to the exterior of the grommet 18 via an arc-shaped or helical cut 11 defined on both sides by chamfered surfaces 7. The exterior diameter of the distal end 4 of the tapered body 1 when measured as if the cut out portion is still in place is smaller than the diameter of the proximal end 5. A relief 2 of a smaller exterior diameter than that of proximal end 5 provides a surface that engulfs the wall of the railing post. The grommet 18 also includes a flange 12 which provides a surface to rest against the post 9. A flange cut 20 is in communication with the helical cut 11 and is defined on both sides by chamfered surfaces 6.

Figure 5:
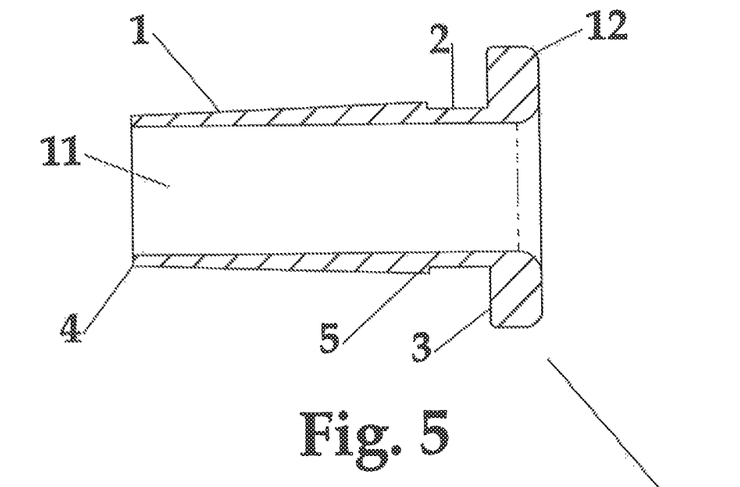
FIG. 5 is a cross section view of the grommet and features.

FIG. 5 illustrates the embodiment of the grommet 18 of FIG. 4 in cross-section. In this embodiment, the body 1 tapers from a proximal end 5 to a distal end 4, with the exterior diameter of the distal end 4 of the tapered body 1 smaller than the exterior diameter of the proximal end 5. The interior of the body 1 includes a longitudinal cannulation 17. The relief 2 is of a smaller exterior diameter than that of proximal end 5 and the flange 12 provides a surface to rest against the post.

Figure 6:
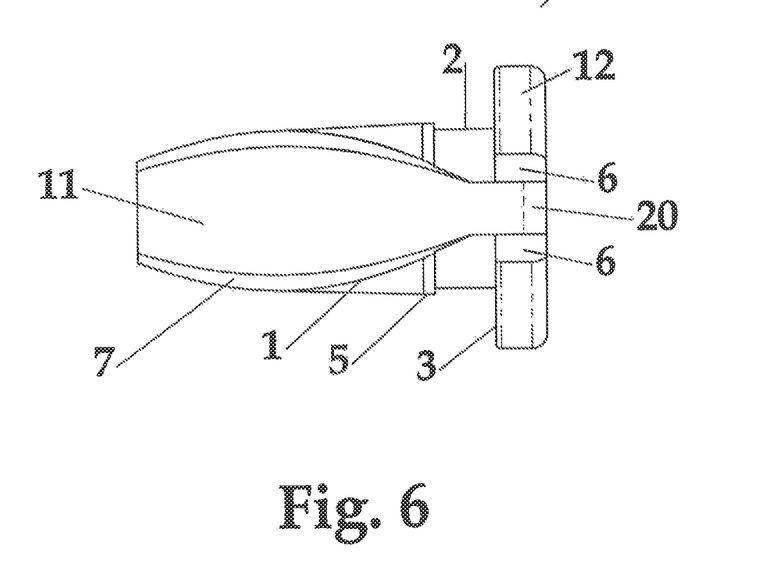
FIG. 6 is a top view of the grommet showing the cut opening and chamfered edges.

FIG. 6 illustrates the top view of the grommet 18 of FIGS. 4 and 5, showing the proximal end 5, the helical cut 11, the relief 2 and the flange 12. Additionally, FIG. 6 shows the flange cut 20 and the chamfered surfaces 6, 7. In FIG. 6 it can be seen that the helical cut 11 does not follow the taper of the body 1. Instead, the chamfered surfaces 7 defining the helical cut 11 form a corresponding are on either side of the helical cut 11. The proximal end of the helical cut 11 in communication with the flange cut 20 is of a smaller diameter than the distal end of the helical cut 11.

Figure 7:
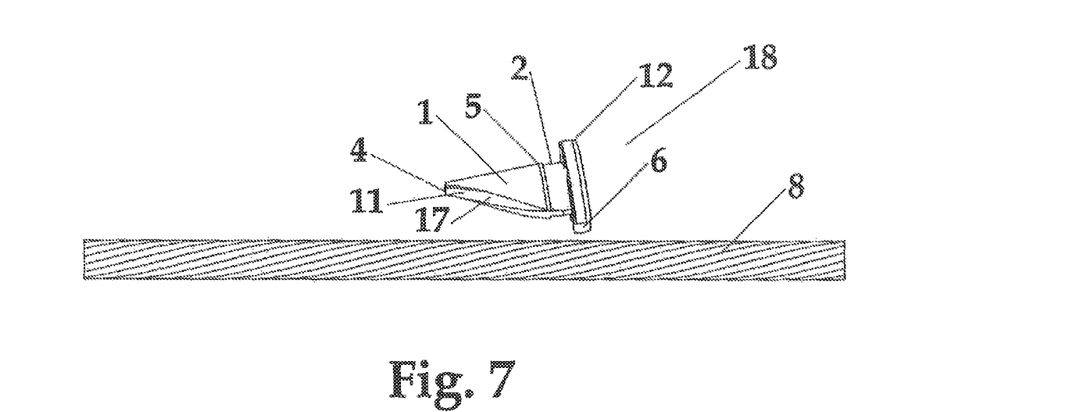
FIG. 7 is a side view of a wire rope with the grommet in a position to engage the cut opening feature onto the wire rope with downward and lateral force to the left to slip over the wire.
Figure 8:
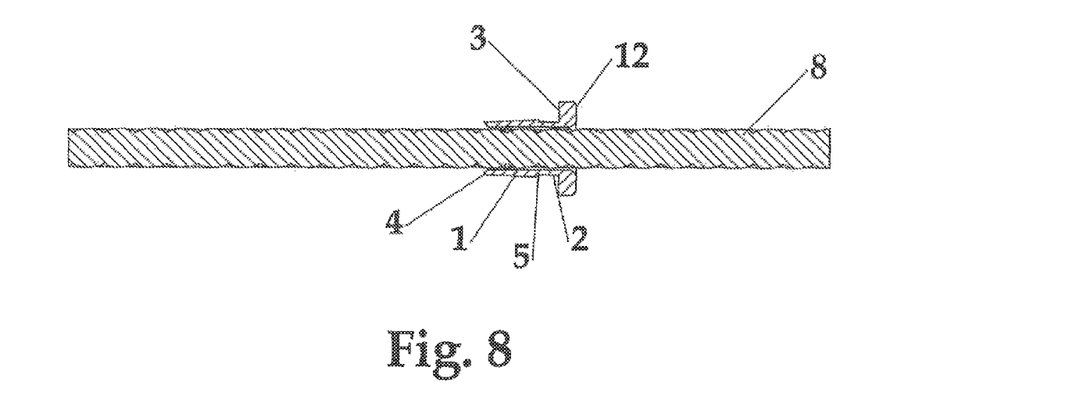
FIG. 8 is a cross section view with the grommet on the wire rope.

In use, the grommet 18, illustrated in FIGS. 7-8 is slid/snapped (positioned) in FIG. 7 over wire rope 8 and the helical cut 11 surrounds the wire 8, downward force engages the chamfered surface 6 to contact the wire 8. With force pushing parallel and downward onto the wire 8, the chamfered surface 6 allows the flange 12 to spread open and the wire 8 engages into the cannulation 17. The helical cut 11 of the cannulation 17 allows the grommet 18 to wrap around the wire 8 as it is sliding on. With a force parallel to the wire 8, the grommet 18 will slide into the cannulation 17 and onto the wire 8 as shown in cross-section in FIG. 8.

Figure 9:
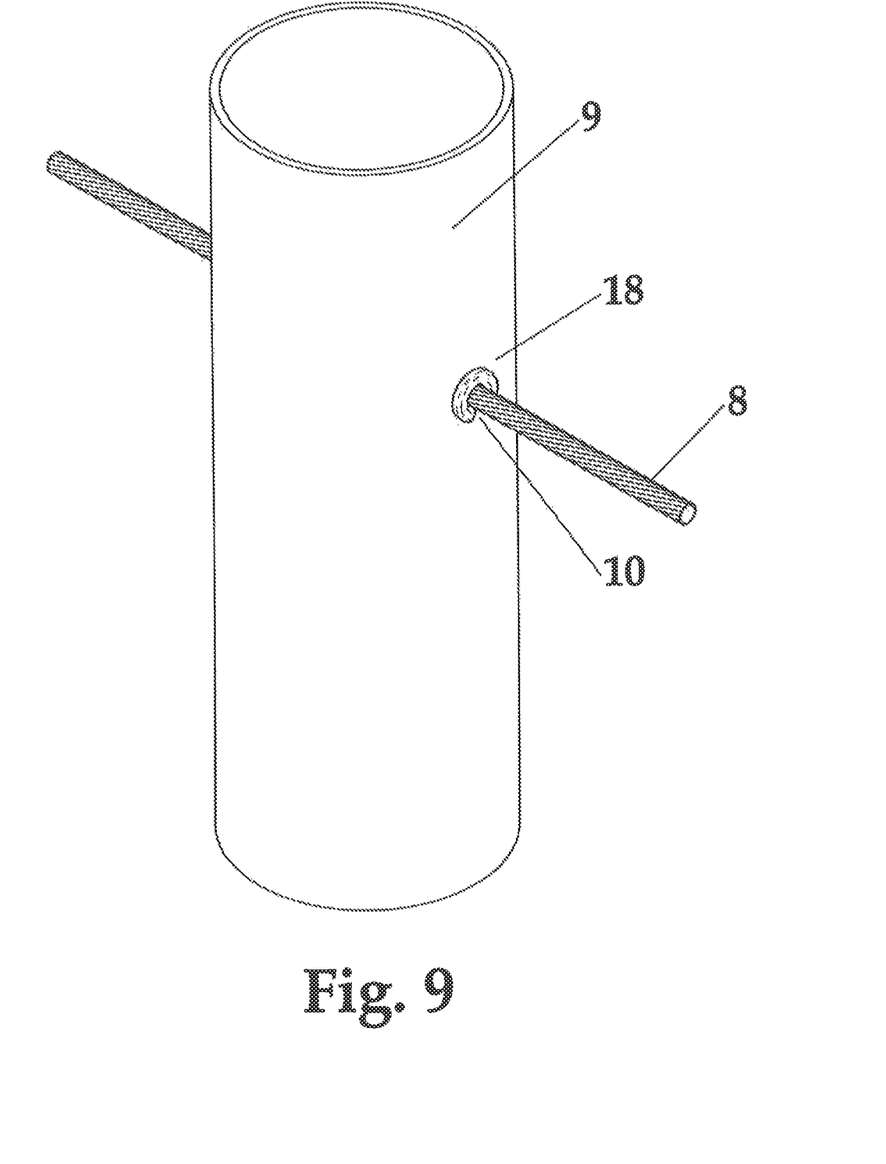
FIG. 9 is a perspective view of the grommet installed in a railing post with wire passing through it.

As shown in FIG. 9, the flange 12 rests against the post 9 and the grommet 18 stays in place due to the relief 2 (see FIGS. 7 and 8) pressing against the post thickness. The difference in the relief 2 diameter and hole 10 diameter place pressure on the grommet 18, thereby keeping the wire rope 8 from any lateral movement.

In the case of wire rope already installed into the post (such as that shown in FIG. 1), the longitudinal cannulation 17 rests against the wire rope 8. Further pressure on the flange 12 pushes the grommet 18 into the post hole 10 retained by the relief 2 and the flange 12. Since the inner diameter is slightly reduced, slight pressure is placed on the wire rope 8.

Although these teachings have been described with respect to various embodiments, it should be realized these teachings are also capable of a wide variety of further and other embodiments within the spirit and scope of the appended claims.

The invention claimed is:

1. A grommet comprising:
   a body comprising a proximal end and a distal end, the body tapering from the proximal end to the distal end;
   a relief adjacent to the proximal end of the body, an outer diameter of the relief being smaller than an outer diameter of the proximal end of the body;
   a flange adjacent to the relief, an outer diameter of the flange being larger than the outer diameter of the proximal end of the body; and
   a non-stepped, longitudinal cannulation extending from a proximal end of the flange to the distal end of the body, the cannulation being in communication with an exterior of the grommet through an opening extending from a proximal end of the flange to the distal end of the body, the opening defined by two opposing helical cuts formed in the body such that no portion of the helical cuts follows the taper of the body.

2. The grommet of claim 1, wherein at least a portion of the opening is defined by two opposing chamfered surfaces.

3. The grommet of claim 1, wherein the grommet is a unitary molded piece.

4. The grommet of claim 1, wherein the grommet is comprised of a clear, rigid material.

5. The grommet of claim 4, wherein the clear, rigid material is plastic.

6. The grommet of claim 4, wherein the clear, rigid material is UV resistant.

7. The grommet of claim 1, wherein the grommet is comprised of an opaque material.

8. The grommet of claim 7, wherein the opaque material is metal or ceramic.

9. A method for securing a rope member using a grommet, the method comprising:
   positioning a grommet over a rope member, the grommet comprising:
      a body comprising a proximal end and a distal end, the body tapering from the proximal end to the distal end; a relief adjacent to the proximal end of the body, an outer diameter of the relief being smaller than an outer diameter of the proximal end of the body; a flange adjacent to the relief, an outer diameter of the flange being larger than the outer diameter of the proximal end of the body; and a non-stepped, longitudinal cannulation extending from a proximal end of the flange to the distal end of the body, the cannulation being in communication with an exterior of the grommet through an opening extending from a proximal end of the flange to the distal end of the body, the opening defined by two opposing helical cuts formed in the body such that no portion of the helical cuts follows the taper of the body;
   pressing the flange onto the rope member, so that the rope member is forced into the flange opening;
   pressing the body onto the rope member, so that the rope member is forced into the longitudinal cannulation; and
   moving the grommet along the rope member so that the distal end of the body enters a bored hole, until the outer diameter of the relief is mounted in a rim of the hole.

10. A method for securing a rope member using a grommet, the method comprising:
   positioning a grommet over a rope member, the grommet comprising:
      a body comprising a proximal end and a distal end, the body tapering from the proximal end to the distal end; a relief adjacent to the proximal end of the body, an outer diameter of the relief being smaller than an outer diameter of the proximal end of the body; a flange adjacent to the relief, an outer diameter of the flange being larger than the outer diameter of the proximal end of the body; and a non-stepped, longitudinal cannulation extending from a proximal end of the flange to the distal end of the body, the cannulation being in communication with an exterior of the grommet through an opening extending from a proximal end of the flange to the distal end of the body, the opening defined by two opposing helical cuts formed in the body such that no portion of the helical cuts follows the taper of the body;

pressing the flange onto the rope member, so that the rope member is forced into the open portion of the flange;

pressing the body onto the rope member, so that the rope member is forced into the longitudinal cannulation; and passing the rope member through a bored hole so that the distal end of the body enters the hole, until the outer diameter of the relief is mounted in a rim of the hole.

11. The method of claim 9, wherein pressing the body onto the rope member comprises pressing the body both parallel to and downward onto the rope member.

12. The method of claim 9, wherein the rope member is a wire rope.

13. The method of claim 9, wherein the bored hole comprises a bored hole in a post of a handrail system.

14. The method of claim 13, wherein, when the outer diameter of the relief is mounted in the rim of the hole, the flange rests against a surface of the post.

15. The method of claim 10, wherein pressing the body onto the rope member comprises pressing the body both parallel to and downward onto the rope member.

16. The method of claim 10, wherein the rope member is a wire rope.

17. The method of claim 10, wherein the bored hole comprises a bored hole in a post of a handrail system.

18. The method of claim 17, wherein, when the outer diameter of the relief is mounted in the rim of the hole, the flange rests against a surface of the post.

19. The grommet of claim 1, wherein the flange is configured to expand when the flange opening is pressed over a rope member.

20. The grommet of claim 1 further comprising a rope member slidably received within the cannulation, the rope member extending outside of the grommet from the proximal end of the flange and from the distal end of the body.

* * * * *